United States Patent [19]

Sassa

[11] 3,793,152
[45] Feb. 19, 1974

[54] METHOD OF AEROBIC CULTIVATION OF MICROBES AND APPARATUS THEREFOR

[75] Inventor: Nagamasa Sassa, Kobe, Japan

[73] Assignee: Kanegafuchi Kagaku Kogyo Kabushiki Kaisha, Osaka, Japan

[22] Filed: June 24, 1971

[21] Appl. No.: 156,451

[52] U.S. Cl. .................. 195/109, 195/115, 195/142
[51] Int. Cl. .............................................. C12b 1/14
[58] Field of Search .................... 195/109, 142, 115

[56] References Cited
UNITED STATES PATENTS

| | | | |
|---|---|---|---|
| 3,630,848 | 12/1971 | Lefrancois | 195/109 |
| 3,114,677 | 12/1963 | Stich | 195/142 |
| 3,625,834 | 12/1971 | Muller | 195/109 |
| 3,139,382 | 6/1964 | Killimger | 195/96 |
| 3,522,147 | 7/1970 | Filosa | 195/28 |

Primary Examiner—Alvin E. Tanenholtz
Assistant Examiner—Thomas George Wiseman
Attorney, Agent, or Firm—Moonray Kojima

[57] ABSTRACT

Method and apparatus for aerobically cultivating microbes in which a cultivating medium including nutrients are dispersed and fed into a tank, dispersing air through the bottom thereof, separating the air from the medium at the top thereof, and circulating the de-aerated medium through a circulating tube and returning same together with added cultivating medium to the tank.

10 Claims, 1 Drawing Figure

PATENTED FEB 19 1974 3,793,152
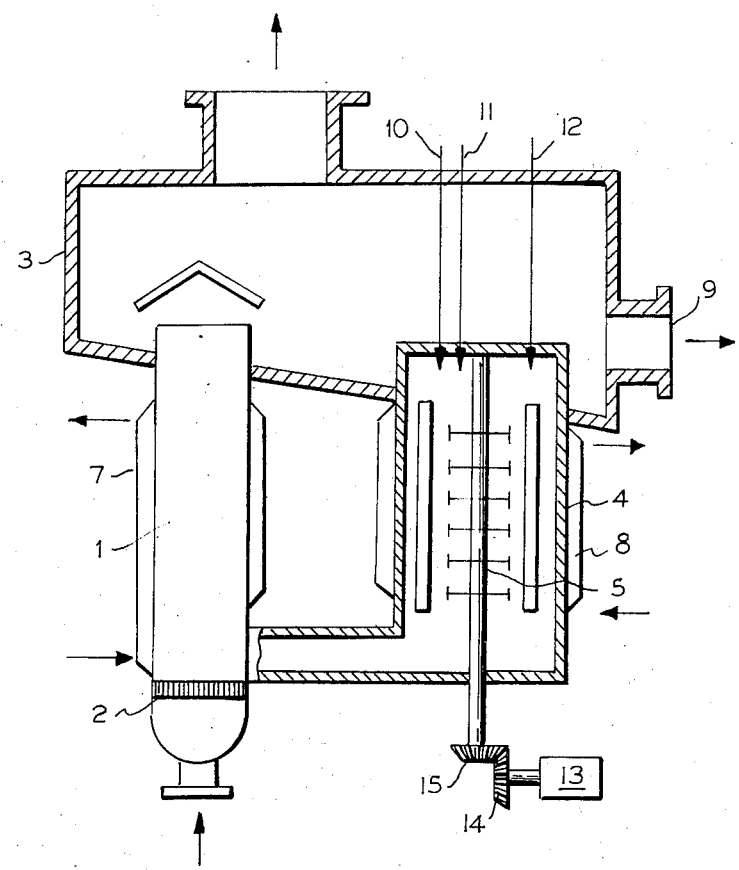
INVENTOR
NAGAMASA SASSA
BY [signature]
ATTORNEY

METHOD OF AEROBIC CULTIVATION OF MICROBES AND APPARATUS THEREFOR

BACKGROUND OF INVENTION

This invention relates to methods of cultivating cultures which are useful for industrial purposes and using hydrocarbons, or oils and fats as a carbon nutrient source.

For proper cultivation of cultures, it is absolutely necessary that the hydrocarbons or oils and fats be homogeneously dispersed as fine particles in a fermentation tank. For this purpose, the carbon nutrient source has heretofore been fed into a fermentation tank in either of two ways (1) by dispersing the carbon nutrient source in a part of the culture medium by using a homogenizer, an ultrasonic device or other equipment, or dispersing directly as a mist from a spray; or (2) as it is, that is without change, then after it is in the tank dispersing the source by using an agitator which may be installed in the tank.

There are many disadvantages and problems associated with these prior art methods and apparatus. For example, when using the first method for large scale cultivation, complex structural problems arise in installation of the apparatus. The method is uneconomical since it requires a large amount of power to run the homogenizer or ultrasonic apparatus. Another disadvantage of the method is that the homogenized carbon nutrient source may coagulate in the tank. As for the latter method, disadvantageously, the larger the capacity of the tank, the greater is the power required to run the agitator. The power required to run an agitator to produce effective dispersion of the carbon nutrient source is given by the following:

$$\text{Power of Agitator} = D^5 N^3 L$$

in which D is the diameter of the rotating wing, N is the number of rotations of the agitator and L is the area of the rotating wing.

The shape of the rotating wing which is suitable for homogenizing may not always be suitable for dispersion of air in the medium to improve the absorption coefficient of oxygen of the tank. Therefore, either aerodispersion or homogenization of the carbon nutrient source can be improved, but only at the sacrifice of improvement of the other.

As mentioned above, the prior art methods have not produced satisfactory results for the growing of cultures in which hydrocarbons, oils and fats are used as a carbon nutrient source. This is one of the reasons known cultivating methods have never been used on an industrial scale.

SUMMARY OF INVENTION

According to the present invention, the disadvantageous problems mentioned above are completely eliminated by a method in which a fermentation tank which is equipped at the bottom thereof with an apparatus, such as a multitubular or impeller type apparatus, for dispersing air, at the top thereof a room or chamber for separating air from the medium, and a circulating tube through which the medium which is deaerated in the separating chamber is returned to the tank, is used for cultivating a culture and in which method hydrocarbons and/or oils and fats are used as a carbon nutrient source which is dispersed homogeneously into the medium by a dispersion apparatus in the circulating tube.

BRIEF DESCRIPTION OF DRAWING

The sole FIGURE in the drawing depicts an illustrative embodiment of an apparatus designed for continuous cultivation according to the present invention.

DETAILED DESCRIPTION OF PREFERRED EMBODIMENT

In the drawing, there is depicted a fermentation tank 1 which is for example of the aerobic fermentation type, equipped at the bottom thereof with apparatus 2 for dispersing air or oxygen into a cultivating medium supplied to the tank 1, and at the top thereof a separating room or chamber 3 for separating air from the medium; and circulating tube 4 through which the medium which is deaerated in separating chamber 3 is returned into tank 1 at a high flow rate caused by the difference between specific gravities of the deaerated medium and of the air dispersed medium.

Inside of circulating tube 4 are an interior section 6 and an agitator 5, for example of a Brumagin type impeller having a plurality of blades or wings 5 and driven by a motor 13 via gears 14 and 15 attached to respective shafts, as depicted. Cooling jackets 7 and 8 are disposed about tank 1 and tube 4. Raw feed material may be fed through supply tubes 10, 11, and 12, with the products removed through outlet 9, as will be discussed in greater detail below.

Hydrocarbons, such as gas, oil, heavy oil, kerosene, or liquid oils, fats or fatty acids may be used as a carbon nutrient source. Solid hydrocarbons such as crude wax or paraffins, or solid fats and fatty acids may also be used as carbon sources. However, if solids are used, they should be liquid at the fermentation temperature. The foregoing sources may also be used in combination with each other and with conventional sources, such as molasses, glucose, or the like.

Other sources of nutrients may be used in the same manner as they are used in previous processes. For example, nitrogen nutrient sources, inorganic salts, growing agents and other types of metabolic essentials may be used.

Cultivating conditions, such as temperature and pH of the medium may be similar to those of the prior art. However, the amount of air which is used is preferably larger than that required in the prior art. For example, the amount of air may be $30 \times 10^{-6}$ g mol $O_2$/atm. min. cc, or more of adsorption coefficient of $O_2$, Kd.

Furthermore, the hydrocarbons or oils and fats should be homogeneously dispersed upon adding into the medium. However, the problems and disadvantages discussed above were encountered when the dispersion was carried out in the tank 1.

The inventor found that satisfactory results were readily obtained when the dispersion of carbon nutrient source into the medium was carried out, not in tank 1 where air is dispersed, but in circulation tube 4 through which the deaerated medium passes. The medium introduced into circulating tube 4 was dispersed with carbon nutrient source by a dispersion apparatus. Since the specific gravity of the medium dispersed with the carbon nutrient source, is larger than that of the air dispersed medium in the tank, the medium dispersed with the source flows quickly into tank 1, wherein air is dispersed into the medium. Thereafter, the same circulation is repeated, namely, the medium is circulated through tank 1, separating chamber 3, circulating tube 4, tank 1, etc.

Since the carbon nutrient source in the medium is homogeneously dispersed by agitator 5 at every pass of the medium through circulating tube 4, the size of the particles of the carbon nutrient source can be kept to a desired size, for example, of 30 $\mu$ or smaller. In some particular cases, the sizes were smaller than 10 $\mu$.

A stirrer or agitator installed in circulating tube 4 may be of any type which can disperse medium into small particles of the mentioned sizes. For example, a stirrer of the Brumagin type using an impeller equipped with six wings 5 is preferrable for this purpose.

Heat of fermentation during cultivation may be removed by cooling jackets 7 and 8 which are installed at or about either one or both of tank 1 and circulating tube 4. One may also use other types of cooling devices, such as an external cooling device to which the medium may be sent for cooling and from which the cooled medium may be returned into the tank.

The circulating tube 4 may be installed, as an alternative embodiment, inside of tank 1. Either embodiment contains certain desireable features.

The microbes which are multiplied by the growing culture may be removed with some medium from outlet 9 provided at the bottom part of separation chamber 3, and then followed by separation from the medium, washing with water and drying. In the case of a continuous operation, the amount of microbes removed from the growing system is controlled by the following relationship:

Residence Time $\theta = (1/\mu)$ (where $\mu$ is the growth rate) within system and the medium including nutrient with main raw materials fed into tank 1 with use of supply tubes 10, 11, and 12. The amount of medium fed into tank 1 is the same as than taken out at outlet 9.

The invention may be carried out also using a nonflow or batch method.

The diameter of circulating tube 4 may be smaller than and independent of the diameter of tank 1 even of a large capacity. Hence, one may use an agitator 5 of small diameter, at a high speed of rotation, which is suitable for homogeneous dispersion of the carbon nutrient source. The agitator 5 of this type requires only a small amount of power for homogeneous dispersion. Thus, large scale manufacture of cultures in tank 1 is possible. The medium of the gas-liquid dispersion system in tank 1 is sent to separating chamber 3 and then returned through circulating tube 4 in which the agitator 5 is positioned, to tank 1 at a high rate of flow caused by specific gravity differences of the media as discussed above. By this procedure, the dispersed particles of the carbonnutrient source never coagulate because the size of the particles can be kept at or below the desired diameter size for the culture, by dispersing the medium as well as whatever else is added to the medium, during each passage through circulating tube 4.

Since the dispersions of the carbon source and air are carried out in separate steps, the best type of apparatus for the dispersions may be selected to be different and independent for each step. It is possible to obtain a large absorption coefficient of oxygen without sacrificing the effective dispersion of the carbon nutrient source in tank 1, which can be of large capacity.

The heat of fermentation can be removed effectively by the cooling apparatus installed either at tank 1 or at circulating tube 4, because the medium circulates through circulating tube 4 at a high rate of flow.

This invention will be further illustrated by the following examples.

EXAMPLE 1.

A tank 1 of 2,000 l capacity designed for continuous operation, as illustrated in the figure, was used. The agitator 5 which was used, was of a Brumagin type equipped with two fixed wings and with equally spaced seven rotating wings operated at 1,200 r.p.m.

An yeast, Candida tropicalis, was continuously aerated by bubbling air into a medium containing various nutrients including the below paraffin and the yeast, from a pipe having a plurality of nozzles, at a flow rate of 2,000 l per min.; and adding into the medium comprising other nutrients a mass of raw wax containing 82 percent by weight of normal paraffin from $C_{15}$ to $C_{32}$ together with other nutrients; and keeping the concentration of yeast at 1.5 percent. The particle diameter of wax in the medium was less than 10$\mu$ and the growth rate of the yeast was 0.24, (i.e. multiplied 0.24 times per minute)

EXAMPLE 2

A 2,000 l culture tank 1 of a nonflow or batch type was used with an agitator of a turbine type comprising two fixed wings and equally spaced seven rotating wings operated at 1,200 r.p.m. As a carbon nutrient source, dark oil (obtained from decomposition with sulfuric acid of a residue of fish oil) was added to the medium of other nutrients, in an amount of 3 percent by weight. The same seed yeast as in Example 1 was inoculated into the medium to an amount of 1.5 percent by weight. The medium was cultivated and aerated by bubbling air into the medium at a flow rate of 2,000 l per min. for 14 hours. A nonflow or batch system was used. The diameter of the dispersed dark oil particles in the medium was less than 12$\mu$. The concentration of yeast was raised up to 2.3 percent, and the average growth of the yeast for the 14 hour culture was 0.23.

EXAMPLE 3

Using the same apparatus as in Example 1, growing of a culture of Pseudomonas aeruginosa in place of yeast was conducted by the same process. The growth rate was 0.22.

Although the foregoing was described in terms of a preferred embodiment, various modifications and variations will be evident to one skilled in the art. All such modifications and and variations are to be considered as being within the spirit and scope of this invention.

What is claimed is:

1. Process for cultivating microbes comprising the steps of:
A. Feeding liquid carbon source and liquid nutrient medium into a vertically disposed elongated circulating tube, said carbon source being selected from the group consisting of hydrocarbons, fats, and oils;
B. mechanically agitating, using a mechanical agitator located within said circulating tube, said carbon source and said nutrient medium while in said circulating tube and without any substantial amount of air thereby to cause homogeneous dispersing of said carbon source into said nutrient medium;

C. supplying said nutrient medium containing dispersed carbon source to a separate cultivating container means disposed substantially vertically and parallel to said circulating tube;

D. inoculating said nutrient medium with said microbes;

E. aerating said nutrient medium by supplying air or oxygen through the bottom of said container means and cultivating said microbes, said nutrient medium flowing upwardly toward the top of said container means;

F. separating said air or oxygen from said nutrient medium in a separate chamber located near said top of said container means after said nutrient medium flows out of said top of said container means and into said chamber;

G. removing part of the resulting deaerated medium together with microbes from said chamber; and H. recirculating said deaerated medium to said circulating tube wherein together with additional nutrient medium, additional carbon source is homogeneously dispersed therein by said mechanical agitation, and then supplied to said container means, said recirculating being at a high rate of flow owing to the difference in specific gravities of said deaerated medium and the aerated medium.

2. Process of claim 1, wherein said container means and/or said channel means are cooled.

3. Process of claim 1, wherein said microbes are *Candida tropicalis* or *Pseudomonas aeruginosa*.

4. Process of claim 1, wherein said air or oxygen is supplied at the rate of $30 \times 10^{-6}$ g mol $O_2$/atm.min. cc or more, of absorption coefficient of $O_2$ Kd.

5. Process of claim 2 wherein said carbon sources has particles of size of up to $30\mu$.

6. Process of claim 1, wherein said carbon source has particles of size up to $10\mu$.

7. Process of claim 1, wherein the time said microbes are cultivated is controlled by the relation:

$$\theta = (1/\mu)$$

wherein $\mu$ is the growth rate.

8. Process of claim 1, wherein said nutrient medium comprises an additive selected from the group consisting of nitrogen, nutrient source, inorganic salts, growing agent and other metabolic essentials, and mixtures thereof.

9. Process of claim 1, wherein said circulating tube is contained within said cultivating container means.

10. Process of claim 1, wherein after the said removing step (G), the removed microbes are then washed with water and then dried.

* * * * *